United States Patent [19]

Wada et al.

[11] Patent Number: 4,551,666
[45] Date of Patent: Nov. 5, 1985

[54] QUICK CHARGING APPARATUS

[75] Inventors: Sumio Wada, Yahata; Satoru Inakagata, Hirakata, both of Japan

[73] Assignee: Matsushita Electric Works, Ltd., Osaka, Japan

[21] Appl. No.: 502,548

[22] Filed: Jun. 9, 1983

[30] Foreign Application Priority Data

Jul. 31, 1982 [JP] Japan ................. 57-134509

[51] Int. Cl.[4] ............................................. H02J 7/00
[52] U.S. Cl. ........................................ 320/20; 320/23; 320/38; 320/40; 320/48
[58] Field of Search .................. 320/20, 22, 23, 37, 320/38, 39, 40, 48

[56] References Cited

U.S. PATENT DOCUMENTS 3,869,657  3/1975  Shoji et al. ......................... 320/23
4,136,311  1/1979  Scheidler ............................ 320/64

Primary Examiner—Peter S. Wong
Assistant Examiner—Anita M. Ault
Attorney, Agent, or Firm—Burns, Doane, Swecker & Mathis

[57] ABSTRACT

A quick charging apparatus capable of performing, in addition to normal charging operation for a secondary battery, a quick charging in the battery only a relatively small amount of energy required for performing desired N operations of an electric appliance to which the apparatus is applied, in a very short time. The apparatus comprises means for feeding a first average charging current of a relatively high level in a relatively short time, and means for feeding a second average charging current of a relatively low level in a relatively long time, said relatively small amount of energy being quickly charged with said first high average charging current.

5 Claims, 6 Drawing Figures

QUICK CHARGING APPARATUS

This invention relates to a quick charging apparatus applicable to small electric appliances and the like.

The small electric appliances specifically having a chargeable power source of a nickel-cadmium battery or the like secondary battery, such as portable electric shavers, electric tooth brushes, electric hair clippers and the like generally have such advantages that they can be used in a cordless form and minimized in size and weight, and the secondary battery can be repetitively used unlike primary batteries.

In the case of such small electric appliances, on the other hand, their usability is determined mostly by the frequency of repetitive use allowed for the appliance after one full charge of the battery and, unless a charged energy enough for achieving expected function by one operation of the appliance remains in the battery immediately before eventual drop of its charged voltage, it is impossible for the user to achieve the expected function perfectly. In such event, there has been a disadvantage that the secondary battery requires a relatively long time to be sufficiently charged even for the one operation energy and the user cannot use the appliance in his haste.

More specifically, it has been found that in the case of, for example, the electric shaver its one-operation time, i.e., the time necessary for the user to shave up his face completely is about 3 minutes on an average, whereas required charging time for general secondary battery incorporated in the electric shavers is at least about one hour. It may be possible to provide a charging apparatus of a reduced charging time but, generally, this involves increments in size of both a power converting means and excess current preventing means, inadequately to the electric appliances the size of which is intended to be minimized. In addition, there have been disadvantages that, when the secondary battery is charged to its full extent, the battery life is shortened and, at the same time, an undesirable gas generation takes place as the pressure in the battery increases. It has also been found that, for a charge of the general secondary battery to the extent of only desired energy enough for the one-operation time of about 3 minutes, it takes about 5 minutes, longer than the operation time. Therefore, a realization of a quick charging apparatus for the secondary battery and free of these disadvantages has been demanded.

An example of such quick charging apparatuses has been suggested in U.S. Pat. No. 3,869,657 granted Mar. 4, 1975 to Shoji et al, and this apparatus attains an intended quick charging operation but is still not suggestive to the realization of the charging of, for example, only a desired amount of energy enough for one-operation of the appliance in a very short time, leaving thus the problem that the apparatus still can do nothing for the hasty use.

It is a primary object of the present invention, therefore, to provide a quick charging apparatus which can reduce the full charging time of a secondary battery employed as a chargeable power source of the small electric appliances, and is still capable of achieving a charge of a desired amount of energy in the secondary battery in a very short time. According to the present invention, therefore, the charging apparatus makes it possible to charge the secondary battery used in, for example, electric shavers to an amount of energy enough for one-operation in about 1 minute, much shorter than the average one-operation time of the shaver, and also to charge the battery to the full extent in about 40 minutes.

Another object of the present invention is to provide a quick charging apparatus which enables the quick charging of the secondary battery with a simple arrangement and is thus adapted to intended minimization in size and weight of the small electric appliances.

A further object of the present invention is to provide a quick charging apparatus which can achieve a large current supply to the secondary battery limited only to an event when it is desired to charge a relatively small amount of energy required, for example, energy enough for a use of the electric appliance just once, whereby any deterioration of the battery and gas generation inside the battery due to the internal pressure rise can be effectively prevented.

Still another object of the present invention is to provide a quick charging apparatus which can inform the user of its optimumly charged state.

Other objects and advantages of the present invention shall become clear from the following description of the invention detailed with reference to certain preferred embodiments of the invention shown in accompanying drawings, in which.

While the present invention shall be described with reference to the embodiments shown in the accompanying drawings, it should be understood that the intention is not to limit the invention only to the particular embodiments, but to rather include all other modifications, alterations and equivalent arrangements possible within the scope of appended claims.

Figure 1:
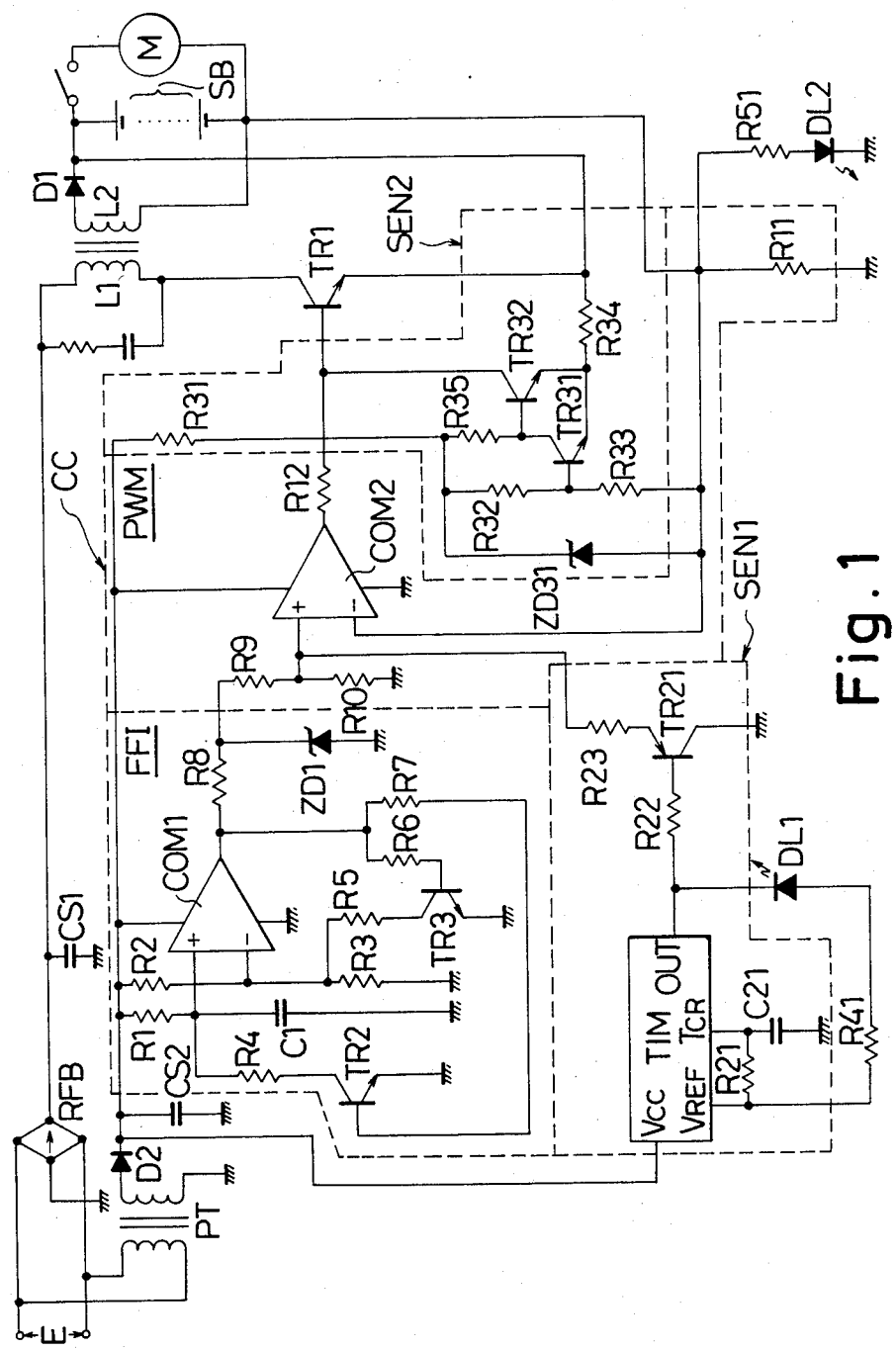
FIG. 1 is a circuit diagram of an embodiment of a quick charging apparatus according to the present invention.

Referring to FIG. 1, there is shown an embodiment of a quick charging apparatus for charging a secondary battery SB, and the apparatus includes a power converting circuit employing an ON/OFF system by means of transistors. More specifically, an alternating current from a commercial power source E is rectified into a direct current through a rectifying bridge circuit RFB and the rectified current is smoothed by a smoothing capacitor CS1 to energize a winding L1 of a transformer, whereby a magnetic energy is accumulated in the winding L1 and transferred to a winding L2 magnetically coupled to the winding L1, a current thereby induced in the winding L2 is further rectified by a diode D1, and the thus rectified current is supplied to the secondary battery SB in an electric appliance for energizing a motor M contained therein.

In the present instance, the winding L1 is connected to a transistor TR1 of a current flowing amount controlled by an output of a charge control circuit CC so that, when the transistor TR1 is turned ON, the magnetic energy can be accumulated in the winding L1 and transferred to the winding L2. The charge control circuit CC includes a frequency fixing circuit FFI and a pulse width modulating circuit PWM, and receives the power from the source E through a rectifying circuit which comprises a power transformer PT, diode D2 connected to a secondary side winding of the transformer PT and smoothing capacitor CS2. The frequency fixing circuit FFI comprises a comparator COM1, transistors TR2 and TR3, resistances R1 to R8 and Zener diode ZD1 and a charging voltage of a capacitor C1 formed by the resistance R1 as well as a reference voltage obtained as divided by the resistances R2 and R3 are applied to the comparator COM1. On the other hand, energy charged in the capacitor C1 can be discharged to the transistor TR2 through the resistance R4, and discharging time of the capacitor C1 can be made constant by rendering to be constant the discharging characteristics of the capacitor C1 with respect to a reference voltage obtained as divided by the resistance R2 and a composite resistance of the resistances R3 and R5 and transistor TR3. With this arrangement, a pulse having a waveform of fixed cycle is provided from an output terminal of the comparator COM1 to the pulse width modulating circuit PWM as stabilized by the Zener diode ZD1.

The modulating circuit PWM comprises a comparator COM2 and resistances R9 to R12, and the comparator COM2 receives for comparison with each other a reference voltage obtained from the output stabilized by the Zener diode ZD1 and divided by the resistances R9 and R10 as well as a voltage obtained at the resistance R11 connected to the winding L2. The current flowing through this winding, and hence the voltage across the resistor R11, is related to the current flowing through the winding L1, to thereby control the pulse width of an output current provided through the resistance R12 to the base of the transistor TR1, whereby the bias current of the transistor TR1 is controlled so as to cause the amount of the supplied current to the winding L1 to be controlled.

According to a remarkable feature of the present invention, the apparatus includes a sensor SEN1 for detecting the charging state of a relatively small amount of energy desired for an operation, that is, a first charging amount, and a sensor SEN2 for detecting the charging state of at least 80% of the charging capacity of the secondary battery, that is, a second charging amount.

The sensor SEN1 for detecting the first charging amount comprises an IC timer TIM, resistances R21 to R23, capacitor C21 and transistor TR21. The timer TIM may be of the type easily available in the market, and comprises a power source terminal $V_{CC}$ connected to the anode terminal of the diode D2 in the rectifying circuit connected to the secondary side of the transformer PT, a reference power terminal $V_{REF}$ for stabilizing a reference oscillation of the timer, a terminal $T_{CR}$ connected to the capacitor C21 and resistance R21 for the oscillation, and an output terminal OUT.

In operation, as soon as the power source is connected to the apparatus, a frequency dividing circuit in the timer TIM is cleared, the reference oscillation determined by the capacitor C21 and resistance R21 is subjected to a frequency division to achieve a predetermined counting, whereupon the output from the output terminal OUT is shifted from its high (H) level to its low (L) level. When the output of the terminal OUT is shifted to L level, the transistor TR21 is turned ON through the resistance R22 so that the resistance R23 connected to the collector of the transistor TR21 will be caused to be inserted in parallel with one voltage dividing resistance R10 of the pulse width modulating circuit PWM, so as to lower the reference voltage provided to a plus side terminal of the comparator COM2 in the pulse width modulating circuit PWM, that is, the terminal to which the stabilized output from the frequency fixing circuit FFI is provided as voltage-divided. As a result, the detecting level of the comparator COM2 is lowered and the transistor TR1 is controlled to vary the amount of current flowing through the winding L1 as well as the value of the charging current for the secondary battery SB provided through the winding L2. It will be readily understood that, in the present instance, the intended object can be realized by selecting the set time of the timer TIM optimumly to be about 1 minute and setting the charging current to be of such a level that can accumulate in the secondary battery SB in an about 1 minute energy required, for example, for performing just once the operation of the electric appliance.

The sensor SEN2 for detecting the second charging amount comprises a Zener diode ZD31, resistances R31 to R35 and transistors TR31 and TR32. In this sensor SEN2, a voltage applied thereto through the resistance R31 is stabilized by the Zener diode ZD31, voltage-divided by the resistances R32 and R33 and applied to the base of the transistor TR31. When the voltage in the battery SB reaches a level higher than that applied to the battery SB through the base and emitter of the transistor TR31 and the resistor R33, then no current is made to flow through the base of the transistor TR31 and thus the transistor TR31 is turned OFF, upon which a current starts to flow through the base of the transistor TR32 to turn ON the same, whereby the base of the transistor TR1 is clamped to make the battery charging current to be zero, responsive to which the battery voltage drops, resulting in that the transistor TR31 is turned ON while the transistor TR32 is turned OFF to have the transistor TR1 turned ON and the charging current supplied again. This operation is intermittently repeated during a period determined by the time constant of the secondary battery so that the charging current will be gradually decreased and an energy accumulation in the battery under a state of its full charge or close thereto will be performed.

Figure 2:
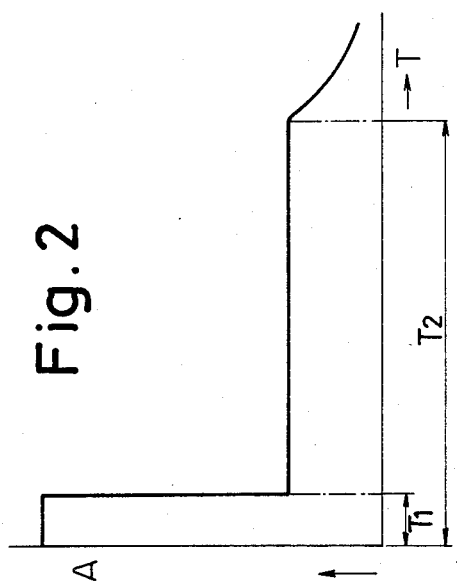
FIG. 2 is a waveform showing time variations of a charging current in the circuit of FIG. 1.

The charging operation shall be further detailed by references to FIG. 2 showing variations of the charging current with time. In the drawings, time T is taken on the abscissa and the amount of current A is on the ordinate. A period T1 is substantially a duration from the power source connection to the control of the transistor TR1 due to the lowering of the detecting level of the pulse width modulating circuit PWM by the output of the first sensor SEN1, during which a first level of charging current considerably higher than a normal level is supplied. Therefore, in the period T1, a relatively small amount of energy desired preferably for just one operation of the electric appliance can be charged in the secondary battery SB as has been described. In this connection, it is most preferable to set the charging time to be about 1 minute.

When the power source is kept connected after the period T1 elapsed, the charging current flows for a period following the period T1 in a total period T2 at a second level dependent on the output of the pulse width modulating circuit, to the base of the transistor TR1 adjusted by the output of the second sensor SEN2, so that 80% or more of the full charging energy can be accumulated in the secondary battery SB. Optimumly, the period T2 is set to be about 40 minutes. It will be appreciated from FIG. 2 that a third charging period follows after the period T2, while the charging current is gradually decreased as the charge in the secondary battery SB comes closer to its full charging state.

According to still another feature of the present invention, there are provided first and second informing means for indicating the respective operating states of the sensors SEN1 and SEN2. The first informing means comprises a light emitting diode DL1 connected between the reference power terminal $V_{REF}$ and the output terminal OUT of the IC timer TIM through a resistance R41, which diode preferably emitting a green light. On the other hand, the second informing means comprises a light emitting diode DL2 connected in parallel with the resistance R11 through a resistance R51, which diode preferably emitting a red light. The diodes DL1 and DL2 operate as follows as the charging current varies with time:

| Period | Diode DL1 | Diode DL2 |
| --- | --- | --- |
| T1 | OFF | ON |
| For T2 after T1 | ON | ON |
| Following T2 | ON | ON and OFF (flashing) |

Figure 4:
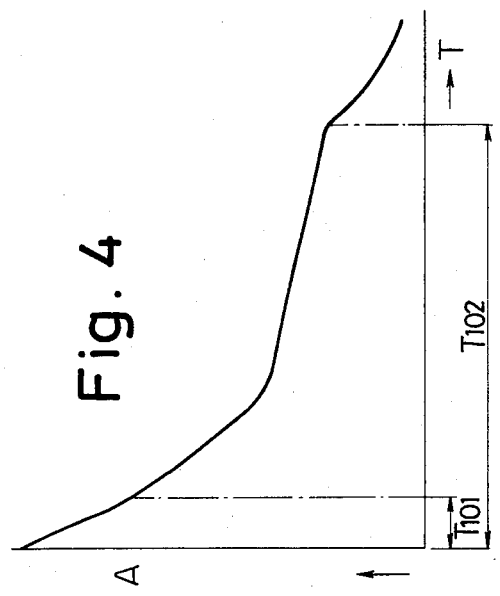
FIG. 4 is a waveform showing time variations of a charging current in the circuit of FIG. 3.
Figure 3:
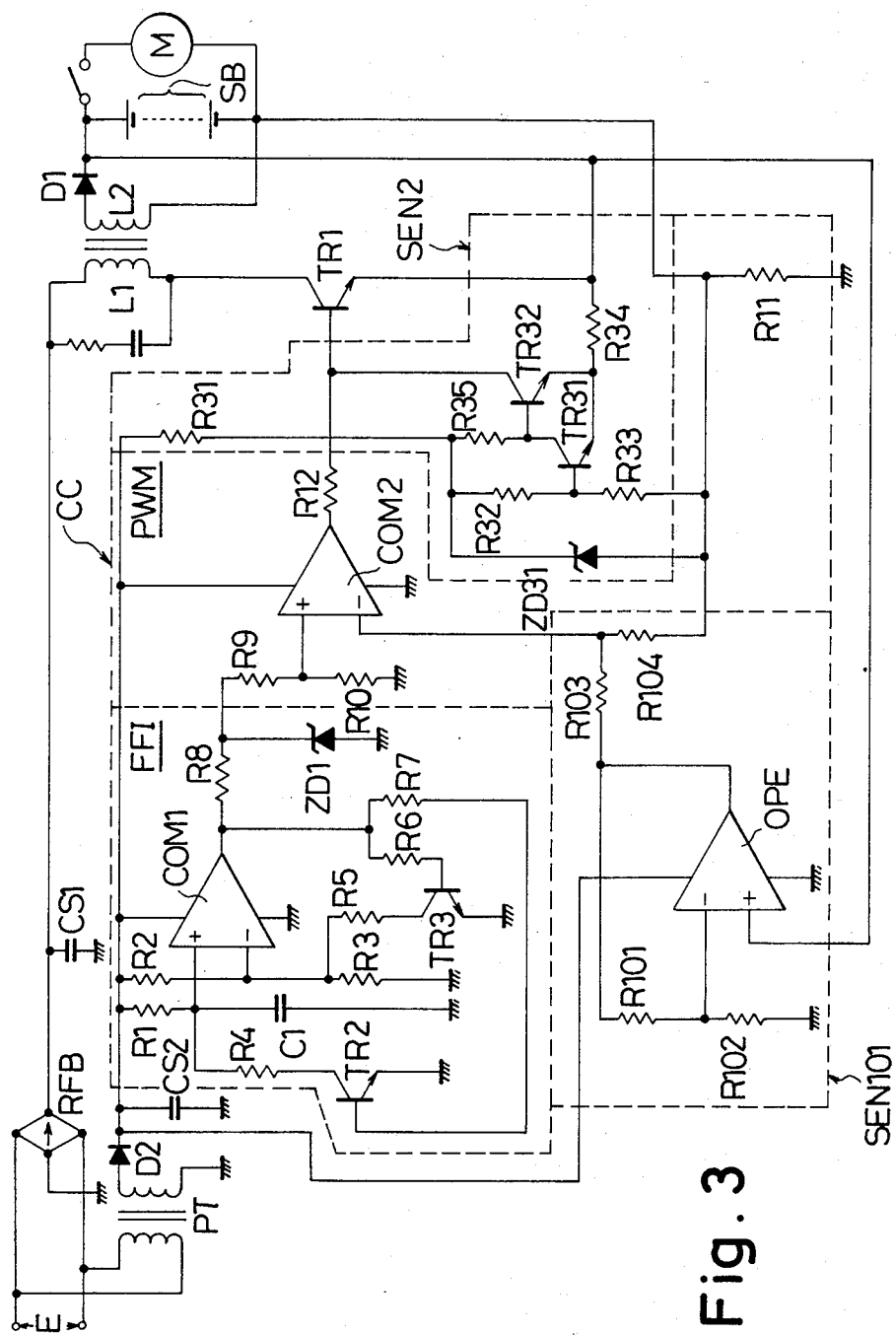
FIG. 3 is a circuit diagram of another embodiment of the quick charging apparatus according to the present invention.

In FIG. 3, there is shown another embodiment of the present invention, wherein the sensor SEN1 for detecting the first charging amount in the embodiment of FIG. 1 is modified, while other components remain unchanged from those in the embodiment of FIG. 1 and thus are shown with the same reference numerals as the corresponding components. In this embodiment, a first sensor SEN101 comprises an operational amplifier OPE and resistances R101 to R104 so that a sum voltage of the battery voltage and a voltage dropped through the resistance R11 is applied to an in-phase amplifier formed by the amplifier OPE and resistances R101 and R102 to be amplified therein. An output of the operational amplifier OPE is voltagedivided by the resistances R101 and R103 and applied to the minus side one of terminals of the comparator COM2 in the pulse width modulating circuit PWM, while the other terminal of the comparator receives the output of the frequency fixing circuit FFI. As the voltage of the secondary battery SB increases, the output of the pulse width modulating circuit PWM is adjusted by means of the first sensor SEN101 so that, as will be clear from FIG. 4, the charging current will be decreased over the entire charging period T102, whereby the load on the secondary battery is much more reduced than in the case of the embodiment of FIG. 1. While no informing means is provided in the embodiment of FIG. 3, such means may be of course provided as occasion demands.

Figure 5:
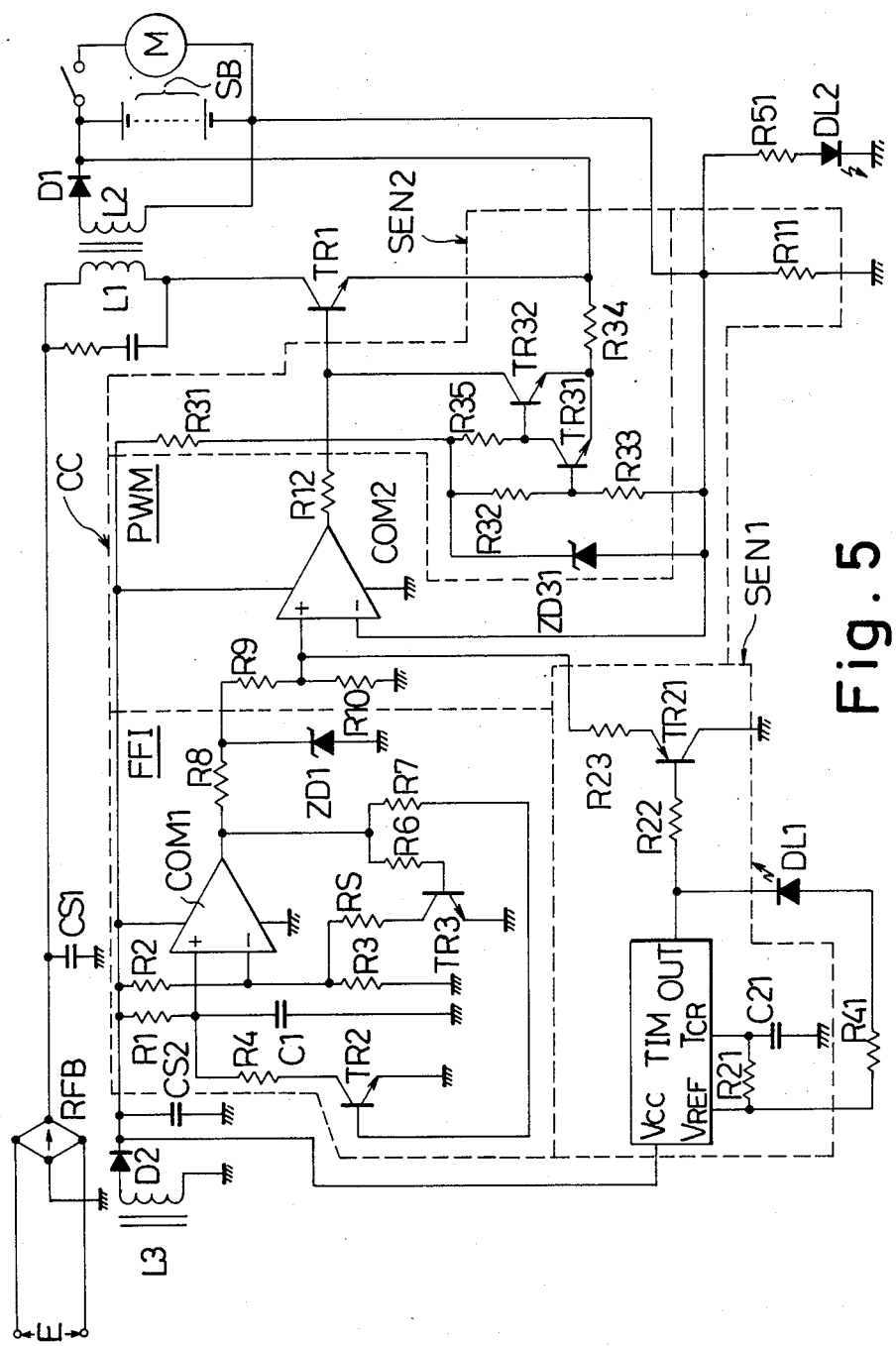
FIG. 5 is a circuit diagram of still another embodiment of the quick charging apparatus according to the present invention.

Referring to FIG. 5, there is shown still another embodiment of the present invention wherein the power feeding circuit to the charge controlling circuit is modified, while other components remain unchanged from those in the embodiment of FIG. 1 and are represented by the same reference numerals as the ones for the corresponding components. In the present embodiment, the source power is caused to be fed to the charge controlling circuit through a winding L3 on the same core as that of the windings L1 and L2 (while shown as separated from L1 and L2 to keep clear correspondence in other components to other circuits shown) so that any large size component for dropping the commercial power voltage can be omitted, and the arrangement is contributive to promotion of the minimization in size of the appliances. Further, since the power feeding circuit is modified, the light emitting diodes DL1 and DL2 operates as in the following, as the charging current varies with time:

| Period | Diode DL1 | Diode DL2 |
| --- | --- | --- |
| T1 | OFF | ON |
| For T2 after T1 | ON | ON |
| Following T2 | OFF | ON and OFF (flashing) |

Figure 6:
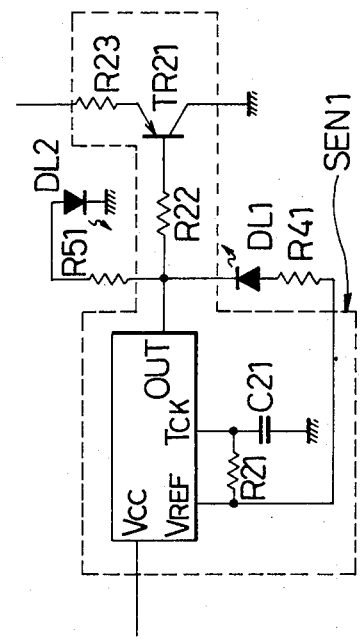
FIG. 6 is a circuit diagram showing a modified example of an informing means in the embodiment shown in FIG. 5.

FIG. 6 shows a still further embodiment in which the connecting position of the second informing means is modified from that in the embodiment of FIG. 5. Other components are the same as those in the embodiment of FIG. 5 and only the first and second informing means and related circuits thereto are illustrated for the purpose of brevity. In this embodiment, the second light emitting diode DL2 of the second informing means is connected through the resistance R51 to the output terminal OUT of the IC timer TIM. Due to that the power feeding circuit to the charge control circuit and connecting position of the second diode DL2 are modified, the diodes DL1 and DL2 operate as in the following, when the charging current varies with time:

| Period | Diode DL1 | Diode DL2 |
| --- | --- | --- |
| T1 | OFF | ON |
| For T2 after T1 | ON | OFF |
| Following T2 | OFF | ON and OFF (flashing) |

While the ON and OFF states of the respective light emitting diodes of the first and second informing means are made different in the respective embodiments of FIGS. 1, 5 and 6, it will be easily appreciated by those skilled in the art that the intention is to have the varying charging state of the secondary battery SB visually recognized at a glance by the user by means of the ON, OFF or flashing state of the diodes DL1 and DL2 throughout the embodiments.

As has been disclosed in the foregoing, according to the quick charging apparatus of the present invention, a relatively small amount of energy desired for an operation or, in other words, energy required for N operations of the appliance (N being an integer, specifically 1 most preferably) can be charged in the secondary battery in a very short time, most preferably in about one minute, with the first average charging current of a relatively high level and, at the same time, 80% or more of the fully charged energy of the secondary battery can be charged in the battery in a relatively long time, most preferably in about 40 minutes, with the second charging current of a much lower level than the first average charging current. Therefore, a required amount of energy, for example, for a one-operation of the appliance can be charged in about one minute, that is, in much shorter time than the average one-operation time of, for example, the electric shavers so as to be highly useful for their hasty use. Furthermore, since the time during which a high level of charging current is supplied to the secondary battery is made extremely short, the operation life of the battery can be well prolonged.

In addition, the intended object of the present invention can be realized with a simple circuit arrangement without need of such large sized circuit parts as in conventional apparatuses, the electric appliance to which the quick charging apparatus of the invention is applicable can be made small without any difficulty.

In the respective embodiments described, further, only typical examples of circuit arrangements for realizing the intended quick charging modes are shown, but any component in the embodiments may be replaced by any other proper member so long as it performs equivalent function. For example, the second sensor in the respective embodiments may be replaced by an IC timer. Also, the first sensor in the embodiment of FIG. 3 can be improved in its control function, if it is so designed that the battery temperature is taken into account as a further correction factor, in addition to the battery voltage.

What is claimed as our invention is:

1. A quick charging apparatus comprising means for feeding power from a apower source to a substantially dead secondary battery, a charge controlling means associated with said power feeding means and including means for adjusting fed power energy, means associated with said charge controlling means for feeding to said secondary battery a first average charging current of a relatively high level in a relatively short time so as to charge the battery with a required amount of energy for performing a single operation of an electric appliance to which said apparatus is applied, and means associated with the charge controlling emans for feeding to the battery a second average charging current of a relatively low level in a relatively long time so as to charge the battery to a level at least 80% of a fully chargeable amount of energy; said means for feeding said first average charging current including a first sensor for detecting said required amount of energy for said single operation in said secondary battery, and said means for feeding said second average charging current including a second sensor for detecting the amount of charge in the secondary battery.

2. An apparatus according to claim 1 wherein said first sensor is a timer and said second sensor is a battery voltage detector.

3. An apparatus according to claim 2 wherein said timer has a set time of about 1 minute.

4. An apparatus according to claim 1 which further comprises a first means for informing completion of said charge by means of said first average charging current, and a second means for informing charged state by means of said second average charging current.

5. An apparatus according to claim 4 wherein said first and second informing means comprise respectively a light emitting diode, said diode forming the first informing means emitting a green light and said diode forming the second informing means emitting a red light.

* * * * *